(12) United States Patent
Levola

(10) Patent No.: US 7,885,506 B2
(45) Date of Patent: Feb. 8, 2011

(54) DEVICE AND A METHOD FOR POLARIZED ILLUMINATION OF A MICRO-DISPLAY

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 209 days.

(21) Appl. No.: 12/286,125

(22) Filed: Sep. 26, 2008

(65) Prior Publication Data

US 2010/0079841 A1   Apr. 1, 2010

(51) Int. Cl.
*G02B 6/10* (2006.01)
(52) U.S. Cl. .......................... 385/146; 385/15; 385/31; 385/33
(58) Field of Classification Search ................. 385/15, 385/31, 33, 46, 146
See application file for complete search history.

(56) References Cited

U.S. PATENT DOCUMENTS 6,445,433 B1 * 9/2002 Levola ........................ 349/113

6,814,442 B2   11/2004 Okuyama et al.
7,050,126 B2 * 5/2006 Schrader et al. ............... 349/57

FOREIGN PATENT DOCUMENTS

WO   WO 2007/057500   5/2007

* cited by examiner

*Primary Examiner*—Jennifer Doan
(74) *Attorney, Agent, or Firm*—Alfred A. Fressola; Ware, Fressola, Van Der Sluys & Adolphson LLP

(57) ABSTRACT

A display device comprises a light source to provide an input light beam, a substrate having an input surface to form an in-coupled light beam by receiving light of the input light beam, wherein the in-coupled light beam is confined to the substrate by total internal reflections, the substrate further comprising a plurality of out-coupling features to form an illuminating light beam by diffracting light of the in-coupled light beam out of the substrate, a display element having a plurality of reflective polarization-rotating pixels arranged to form reflected light beams by reflecting light of the illuminating light beam, and imaging optics to form an image by focusing or collimating light of the reflected light beams transmitted through the out-coupling features.

13 Claims, 9 Drawing Sheets

DEVICE AND A METHOD FOR POLARIZED ILLUMINATION OF A MICRO-DISPLAY

FIELD OF THE INVENTION

The present invention relates to display devices (apparatuses) comprising polarization-rotating reflective display elements.

BACKGROUND OF THE INVENTION

Referring to FIG. 1, an image projector according to prior art comprises a light source 360 to provide light B0, and a polarizing beam splitter 260 to form a polarized illuminating light B2 by reflecting light B0. The illuminating light B2 impinges on the pixels P1, P2, P3 of a reflective micro display 200. Depending on the state of the pixels P1, P2, P3, light B3 reflected from each pixel P1, P2, P3 may have the same polarization state as the illuminating light B2, or its polarization may be changed. Only light whose polarization state has been changed passes through the splitter 260 to the imaging optics 300. The imaging optics 300 focuses or collimates light B3 so as to form light B5. The light B5 may be directed to a screen in order to project an image IMG.

The polarizing beam splitter 260 is typically an inclined plate or a polarizing cube beam splitter. The dimension of these components in the direction SZ is rather large. Thus, it may be difficult to incorporate a prior art image projector e.g. into a slim mobile phone.

U.S. Pat. No. 6,814,442 discloses a virtual display device comprising a prism, which is combined with polarizers.

SUMMARY OF THE INVENTION

An object of the invention is to provide a device (apparatus) and a method for displaying images.

A further object of the invention is to provide a polarization-preserving light distributing device suitable for use in a display device.

According to a first aspect of the invention, there is provided a device (apparatus) comprising:
  a light source to provide an input light beam,
  a substrate having an input surface to form an in-coupled light beam by receiving light of said input light beam, wherein said in-coupled light beam is substantially polarized, and wherein said in-coupled light beam is confined to said substrate by total internal reflections, said substrate further comprising a plurality of out-coupling features to form an illuminating light beam by diffracting light of said in-coupled light beam out of said substrate,
  a display element having a plurality of reflective polarization-rotating pixels arranged to form reflected light beams by reflecting light of said illuminating light beam, and
  imaging optics to form an image by focusing or collimating light of said reflected light beams transmitted through said out-coupling features.

According to a second aspect of the invention, there is provided a device (apparatus) for distributing light, said device comprising:
  a substrate,
  an input surface to form an in-coupled light beam by receiving light of an input light beam into said substrate, wherein said light substrate is arranged to confine light of said in-coupled light beam to said substrate by several consecutive total internal reflections, and
  a plurality of out-coupling features to form an illuminating light beam by diffracting light of said in-coupled light beam out of said substrate, said out-coupling features being further arranged to reduce or prevent transmission of a reflected light beam through said out-coupling area when said reflected light beam has a different polarization state than said in-coupled beam.

According to a third aspect of the invention, there is provided a method for displaying an image, said method comprising:
  providing an input light beam,
  forming an in-coupled light beam by coupling light of said input light beam into a substrate, wherein said in-coupled light beam is substantially polarized, and wherein light of said in-coupled light beam is confined to said substrate by total internal reflections,
  diffracting light of said in-coupled light beam out of said substrate by a plurality of out-coupling features in order to form an illuminating light beam,
  reflecting light of said illuminating light beam by a plurality of reflective polarization-rotating pixels in order to form reflected light,
  transmitting said reflected light through said out-coupling features, and
  focusing or collimating said reflected light transmitted through said out-coupling features in order to display said image.

According to a fourth aspect of the invention, there is provided a device (apparatus) comprising:
  a light emitting means to provide an input light beam,
  a light distribution means having an input means to form an in-coupled light beam by receiving light of said input light beam, wherein said in-coupled light beam is substantially polarized, and wherein said in-coupled light beam is confined to said light distribution means by total internal reflections, said light distribution means further comprising out-coupling means to form an illuminating light beam by diffracting light of said in-coupled light beam out of said light distribution means,
  a display means comprising a plurality of reflective polarization-rotating light-modulating means arranged to form reflected light beams by reflecting light of said illuminating light beam, and
  imaging means to form an image by focusing or collimating light of said reflected light beams transmitted through said out-coupling means.

A light distributing device according to the invention may use less space than a polarizing beam splitter. The light distributing device may be e.g. a light distribution plate.

The use of the light distributing device according to the invention may allow reduction of the distance between a display element and imaging optics. This may allow a reduced back focal length and/or increased freedom to choose the parameters of the optics.

The light distributing device may distribute light provided by a light source to an illuminated area which is larger than the output aperture of said light source. The use of the light distributing device according to the invention may allow the use of smaller light source than in prior art devices and/or the light source may be positioned in such a way that the size of the display device may be reduced.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION

Figure 1:
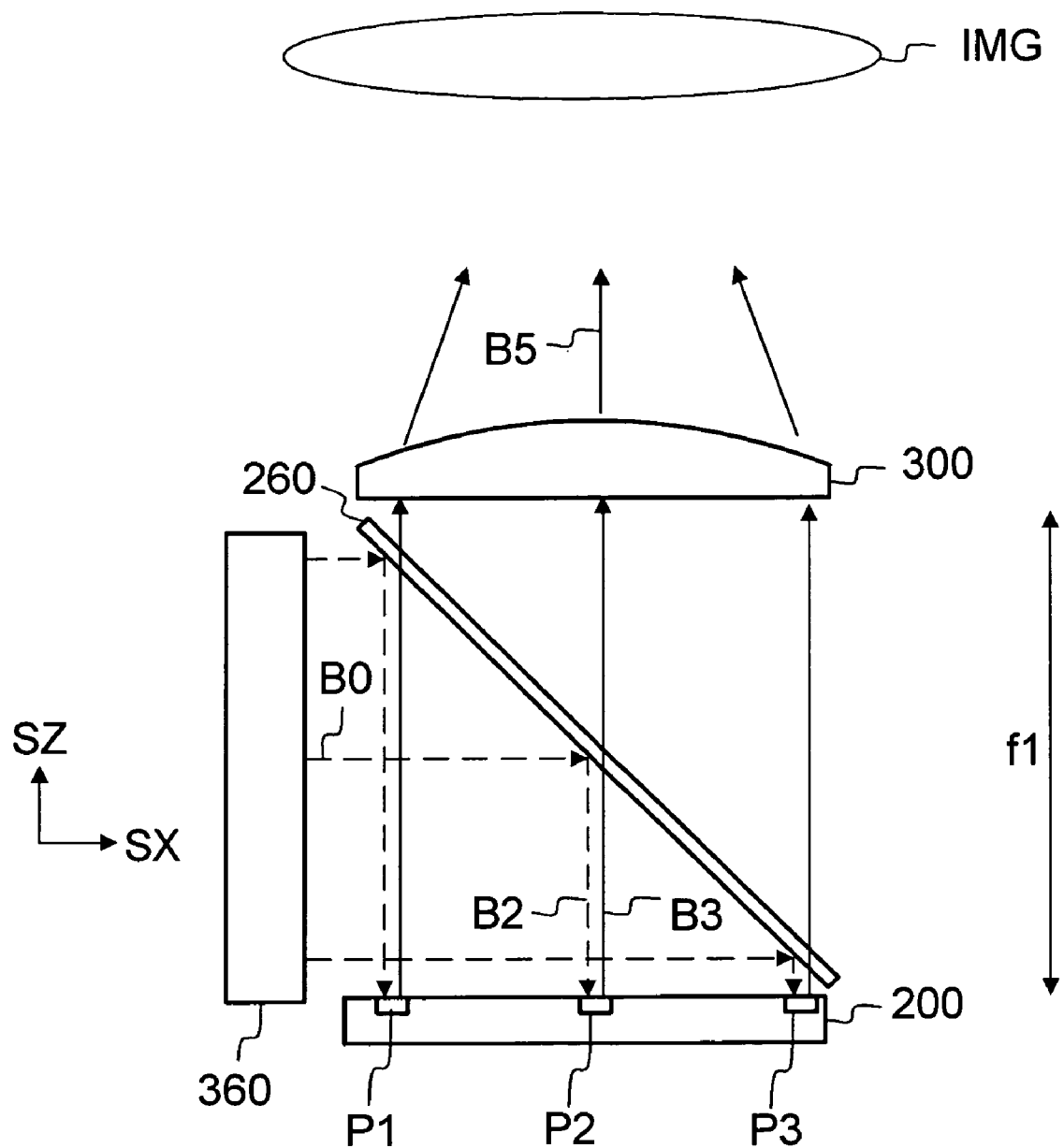
FIG. 1 shows an image projector according to prior art.
Figure 2:
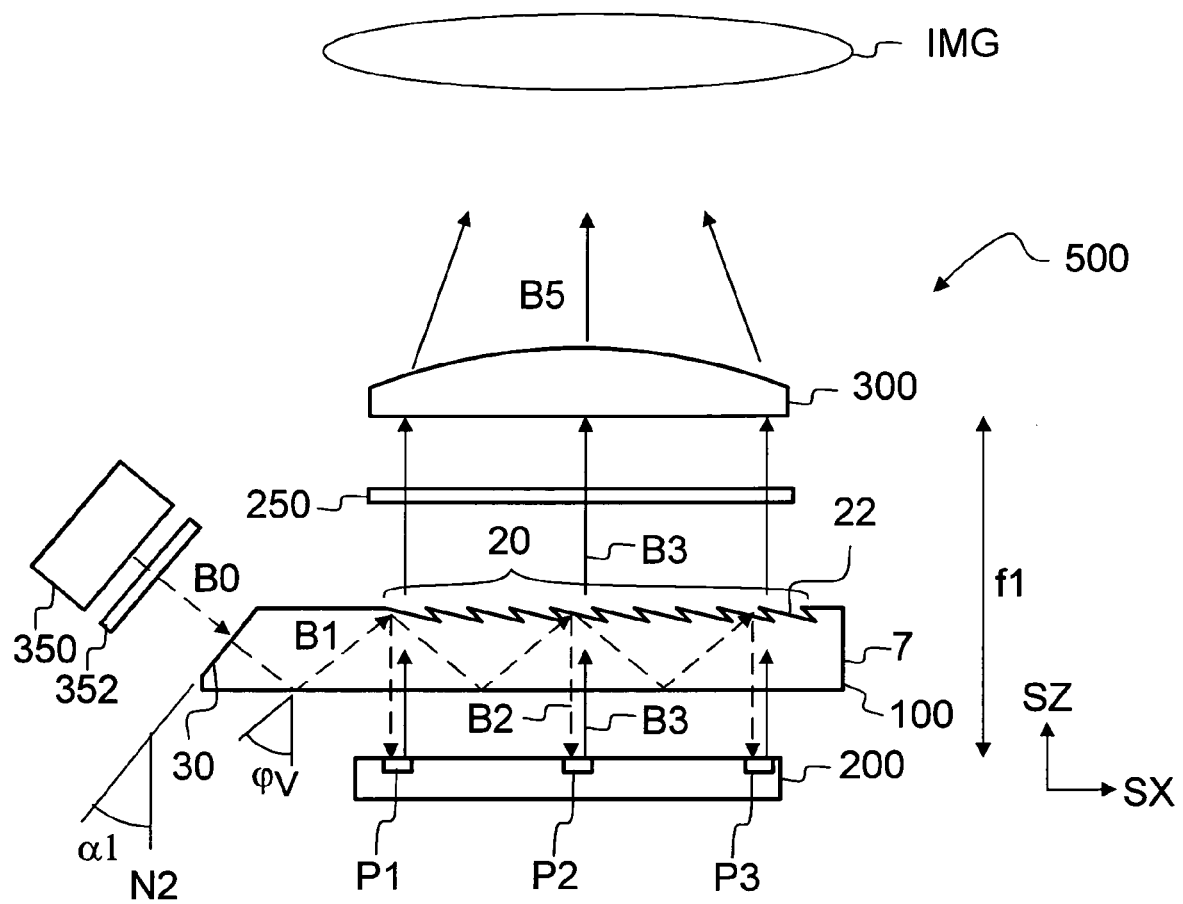
FIG. 2 shows a display device comprising a polarization-preserving light distributing device.

Referring to FIG. 2, an imaging device 500 may comprise a light source 350 to provide a polarized input light beam B0, a light distributing device 100 to distribute illuminating light to a reflective display element 200, a polarizer 250 to reject unwanted light, and imaging optics 300 to focus or collimate light in order to display an image IMG.

The light distributing device 100 comprises a light-transmitting substrate 7 to guide light by total internal reflections. The substrate 7 may be e.g. substantially planar.

The light beam B0 may be coupled to the substrate 7 of a light distributing device 100 e.g. through an inclined in-coupling facet 30 to form an in-coupled beam B1. The in-coupled light beam B1 may be confined to the substrate 7 by total internal reflections at the surfaces of substrate 7.

Several consecutive total internal reflections at the surfaces of the substrate 7 help to distribute light over a larger illuminated area. The thickness-to-length ratio of the substrate 7 may be selected so as to provide two or more consecutive reflections.

Light of the in-coupled beam B1 is coupled out of the substrate 7 by out-coupling features 22 of an out-coupling area 20 in order to form an illuminating light beam B2. Light of the illuminating beam B2 impinges on the pixels P1, P2, P3 of the display element 200.

The display element 200 comprises pixels P1, P2, P3 which are reflective and which may change the polarization of light. Light of the illuminating beam B2 is reflected by the pixels P1, P2, P3 in order to form reflected light B3. Light of the reflected light B3 may be transmitted through the out-coupling area 20 to the imaging optics 300 or be blocked depending on the polarization state of the reflected light B3

The reflected light B3 is focused or collimated by the imaging optics 300 to form an image IMG.

Figure 5:
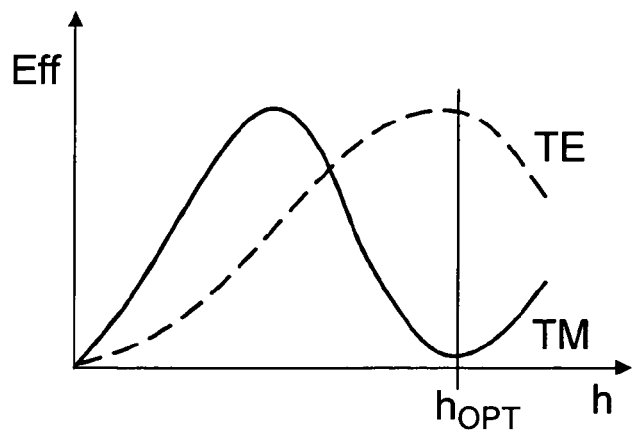
FIG. 5 shows the diffraction efficiency of a grating as a function of profile height for TE-polarized light and for TM-polarized light.

The out-coupling features 22 may be e.g. diffractive grooves or ridges. Consequently, the out-coupling area 20 may be a diffractive grating. Referring to FIG. 5, a diffraction grating formed by diffractive out-coupling elements may have different diffraction efficiency for TE- and TM-polarized light. Thus, the out-coupling area 20 may be arranged to effectively couple TE-polarized light out-of the substrate 7, while allowing TM-polarized light to pass through the area 20.

Now, when a pixel P1, P2 and/or P3 is in the "on" state, it may change the polarization of light. Thus, the pixel P1, P2 and/or P3 may provide TM-polarized light by reflecting light of the TE-polarized illuminating beam B2. The TM-polarized light may now propagate through the out-coupling area 20 and through the polarizer 250 to the imaging optics 250.

On the other hand, when a pixel P1, P2 and/or P3 is in the "off" state, light reflected from said pixel may preserve its original polarization. In that case, the TE-polarized illuminating light B2 may provide TE-polarized reflected light B3.

A part of TE-polarized reflected light B3 may be directed back towards the light source 350 by the out-coupling features 22 of the out-coupling area 20.

Residual TE-polarized light which has passed through the out-coupling area 20 may be blocked by the polarizer 250. Thus, a very high contrast may be attained when the illuminating light B2 is linearly polarized.

The polarizer 250 may be e.g. a thin polarizing film. The polarizer 250 may also be positioned after the imaging optics 300. f1 denotes the distance between the imaging optics 300 and the display element 200.

When a diverging and linearly polarized light beam is refracted by the refractive input facet 30, the corresponding in-coupled beam B1 will be slightly elliptically polarized. The input facet 30 may be inclined so that the input facet is substantially perpendicular to the polarized light beam B0. This helps to maintain the degree of polarization of the in-coupled beam B1 as high as possible.

The input facet 30 may have an angle α1 with respect to the normal N2 of the out-coupling area 20. The angle α1 may be e.g. in the range of 20 to 50°, preferably in the range of 35 to 45°.

The input facet 30 may be substantially perpendicular to the input beam B0. The angle α1 and/or the direction of the light beam B0 may be selected such that in-coupled light B1 is confined to the substrate 7 by total internal reflections (TIR).

Directions of the light rays of the in-coupled beam B1 may be defined by a vertical angle $\phi_V$ and a horizontal angle (the horizontal angle is not shown in FIG. 2).

The image IMG may be formed of light reflected by two or more independently controllable pixels P1, P2, P3. The display element 200 may comprise e.g. a two-dimensional array of 1024×768 pixels to display XVGA images (according to the Extended Video Graphics Array standard).

The display element 200 is a two-dimensional light modulator array, which does not emit light itself.

The imaging optics 300 may comprise e.g. one or more lenses to collimate or focus light B5.

The imaging device 500 may comprise a further polarizer 352 to form a substantially polarized input beam B0 by polarizing light provided by the light source 350. In that case the light source 350 may also initially provide non-polarized light or light which is not linearly polarized.

A further polarizer 352 may also be attached to the input surface 30 so as to form a substantially linearly polarized in-coupled beam B1 by polarizing light of the light beam B0. Also in that case the light source 350 may also initially provide non-polarized light B0 or light B0 which is not linearly polarized.

The light source 350 may comprise one or more light emitting diodes (LEDs). The light source 350 may LEDs which provide different colors and which are operated sequentially in time synchronization with the pixels P1, P2, P3 of the display element 200 so as to display color images.

SX, SY, and SZ denote orthogonal directions.

Figure 3:
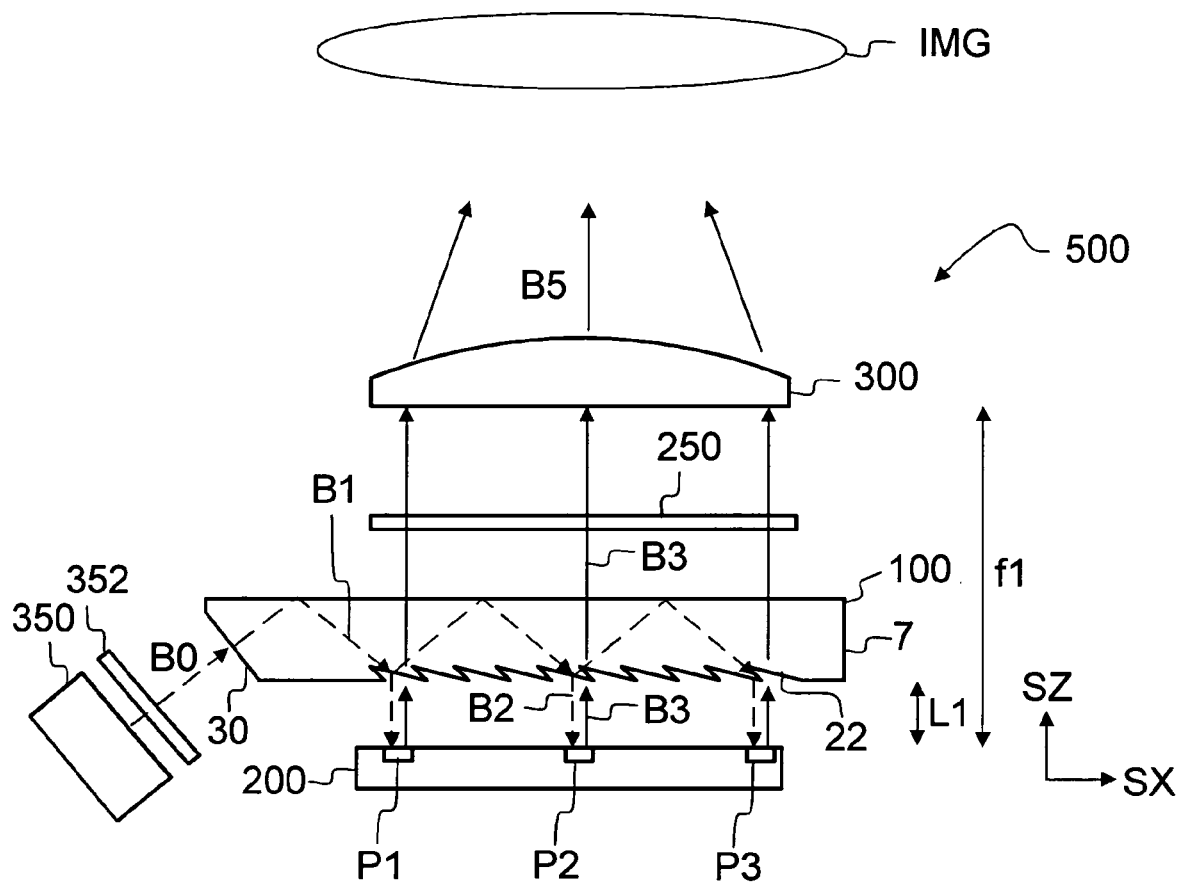
FIG. 3 shows a display device comprising a light distributing device, wherein light out-coupling features of said light distributing device are used in the transmissive mode.

L1 denotes a distance between the out-coupling area 20 and the display element 200 (FIG. 3).

The normal of a reflective, refractive, or diffractive surface and the direction of propagation of a light ray define a plane of incidence. The plane of incidence is perpendicular to said surface. The electric field vector of TM-polarized light is parallel to said plane of incidence, and the electric field vector of TE-polarized light is perpendicular to said plane of incidence. TM is an acronym for the English words Transverse Magnetic, and TE is an acronym for the English words Transverse Electric.

The light distributing device 100 may further comprise e.g. protrusions and/or holes (not shown) to facilitate fixing of the light distributing device 100 to the imaging device 500.

Referring to FIG. 3, the out-coupling features 22 of the out-coupling area 20 may also be used in a transmissive mode. Also in this case the out-coupling features 22 may be arranged to couple TE-polarized light out of the substrate 7 so as to form illuminating light B2. However, unlike in FIG. 2, the illuminating beam B2 provided by the out-coupling features 22 is not transmitted through the substrate 7 before said beam B2 impinges on the pixels P1, P2, P3.

Figure 4:
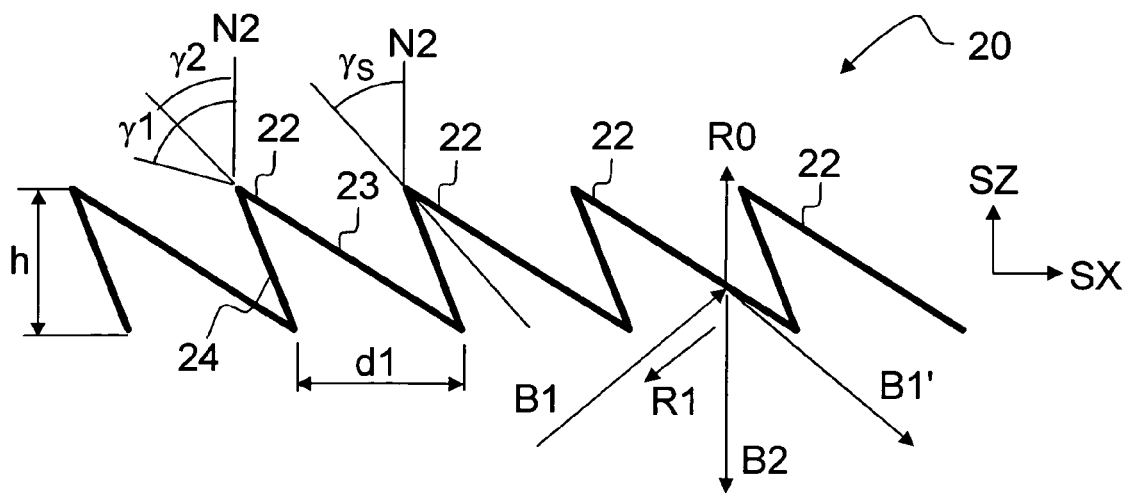
FIG. 4 shows light out-coupling features having an overhanging sawtooth profile.
Figure 6:
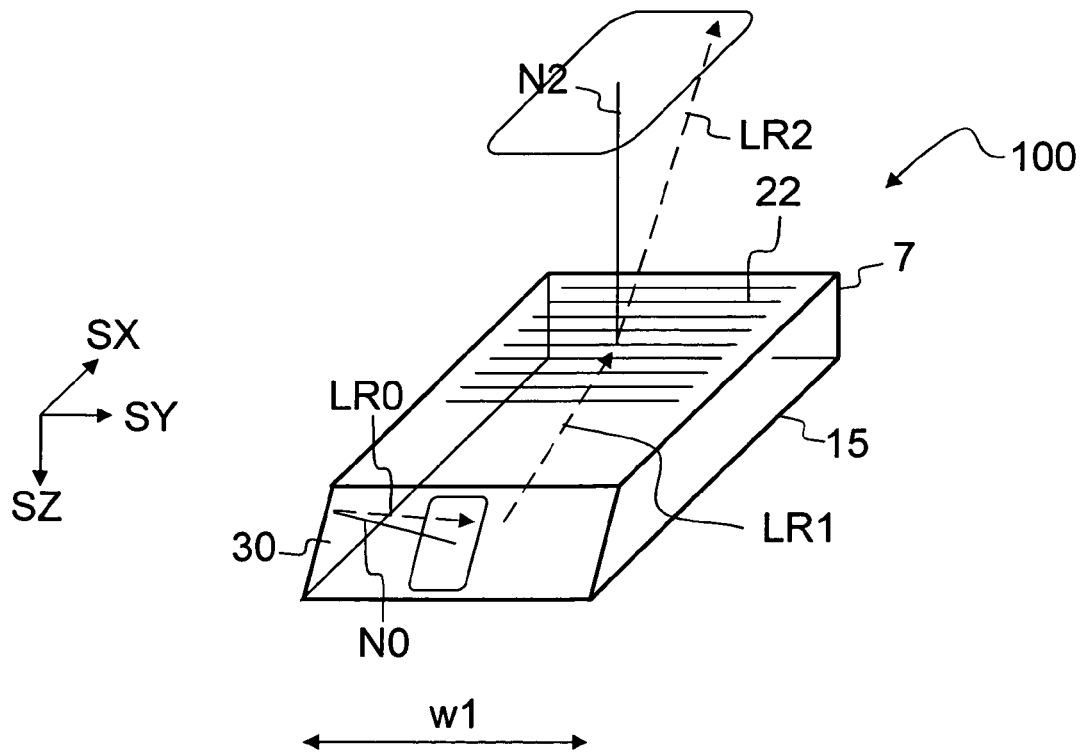
FIG. 6 shows propagation of light rays to the light distributing device, in the light distributing device, and out of the light distributing device.

Referring to FIG. 4, the out-coupling features 22 may be substantially linear diffractive ridges arranged to form a diffractive grating. The out-coupling features 22 may be substantially parallel to the direction SY (FIG. 6). The out-coupling area 20 may be a diffractive grating. The grating period may be equal to d1 and the height of the diffractive features 22 may be equal to h1.

It is advantageous to maximize diffraction efficiency in the direction of the illuminating light beam B2, and to minimize diffraction efficiencies in the directions R0 and R1, as indicated by the arrows in FIG. 4. Light diffracted directly in the direction R0 propagates towards the imaging optics 300 and may reduce contrast. Light diffracted backwards in the direction R1 propagates towards the light source 350 without illuminating the display element 200. Thus, light propagating in the directions R0 and R1 is wasted.

A part of the beam B1, namely B1' continues to propagate within the substrate 7 and may be diffracted towards the display element 200 when it impinges on the out-coupling features 22 at a different location. FIG. 4 shows a light beam B2 generated by reflective diffraction, i.e. the in-coupled beam B1 and the diffracted beam B2 both propagate in the inner side of the out-coupling features 22. FIG. 3 showed transmissive diffraction, i.e. the in-coupled beam B1 propagates in the inner side of the out-coupling features 22, and the diffracted beam B2 propagates in the outer side.

The profile of the out-coupling features 22, the height h of the out-coupling features 22 and/or the grating period d1 may be selected so as to optimize diffraction efficiency in the direction of the beam B2 and/or to minimize the diffraction efficiency for the polarization-rotated beam B3. Also the angles $\gamma 1$ and $\gamma 2$ of a sawtooth profile may be selected so as to optimize diffraction efficiency in the direction of the beam B2 and/or to minimize the diffraction efficiency for the polarization-rotated beam B3.

Figure 10A:
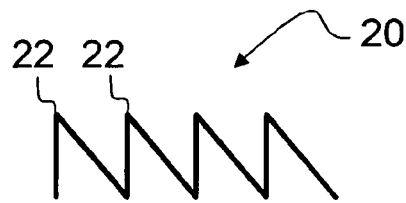
FIG. 10a shows out-coupling features having a sawtooth profile.
Figure 10B:
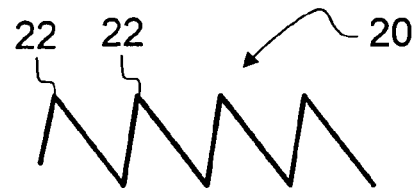
FIG. 10b shows out-coupling features having a sawtooth profile.

The out-coupling features 22 may have a sawtooth profile. $\gamma 1$ denotes an angle between a first surface 23 of the profile and the normal N2. $\gamma 2$ denotes an angle between a second surface 24 of the profile and the normal N2. The sawtooth profile may be an overhanging sawtooth profile, wherein both angles $\gamma 1$ and $\gamma 2$ have the same sign, i.e. both are positive or both are negative. For comparison, FIGS. 10a, and 10b show sawtooth profiles which are not overhanging.

The angles $\gamma 1$ and $\gamma 2$ are limited to the range of −90° to 90°. An angle $\gamma 1$ or $\gamma 2$ which is on the left side of the normal N2 is defined to be positive (counterclockwise rotation). An angle $\gamma 1$ or $\gamma 2$ which is on the right side of the normal N2 is defined to be negative (clockwise rotation).

The angle $\gamma 1$ may be e.g. in the range of 40 to 75°, preferably in the range of 55 to 70°. The angle $\gamma 2$ may be e.g. in the range of 10 to 60°, preferably in the range of 25 to 55°. The average value if the angles $\gamma 1$ and $\gamma 2$ is called as the slant angle $\gamma_S$ (see also FIG. 10g). The slant angle $\gamma_S$ may be e.g. in the range of 30 to 65°, preferably in the range of 45 to 60°.

The grating may be made of e.g. episulfide. The surfaces 23, 24 of the out-coupling features 22 may slightly deviate from planar form. The edge between the first 23 and second 24 surfaces of the profiles may be sharp or rounded.

FIG. 5 shows diffraction efficiency Eff of a diffraction grating for TE- and TM-polarized light as a function of profile height h. An optimum profile height $h_{opt}$ may be selected so as to optimize diffraction efficiency in the direction of the in-coupled light beam B2 and/or to minimize the diffraction efficiency for the polarization-rotated reflected light beam B3. The in-coupled light beam B2 may be TE-polarized, and the reflected beam B3 may be TM-polarized.

The diffraction efficiency means the ratio of the power of the light diffracted in a predetermined diffraction order to the power of in-coming light.

Each beam may comprise a nearly infinite number of light rays propagating in different directions. Referring to FIG. 6, the light beam B0 provided by the light source 350 may be a diverging light beam, i.e. it comprises light rays LR0 whose direction deviates from the main direction of the beam B0. The direction of each light ray LR0 may be defined by a horizontal angle and a vertical angle.

The in-coupled light beam B1 may be diverging and it may comprise light rays LR1. The out-coupled light beam B2 may be diverging and it may comprise light rays LR2. N0 denotes the normal of the input surface 30.

The divergence of the light beams B0 may be limited in the vertical direction and in the horizontal direction in order to maximize contrast of the image IMG.

The term w1 denotes the width of the substrate 7 and the symbol 15 denotes the edges of substrate 7. The width w1 may be so large with respect to the horizontal divergence of the in-coupled beam B1 that light of the in-coupled beam does not impinge on the side walls of the substrate 7.

Alternatively, the width w1 may also be selected so that a part of light of the in-coupled beam B1 impinges on the side walls of the substrate 7. This may provide a smaller size of the substrate 7 and/or this may provide a more homogeneous intensity at different locations of the out-coupling area 20.

If the in-coupled beam B1 impinges on the side walls of the substrate 7, the edges 15 between the side walls and the upper and lower surfaces may be sharp and substantially rectangular so as to preserve the polarization state of the light reflected from the side walls.

The surface normals N0 and N2 may be in the SX-SZ-plane. The out-coupling area 20 may be in the SX-SY-plane. The out-coupling features 22 may be substantially parallel to the direction SY.

Figure 7A:
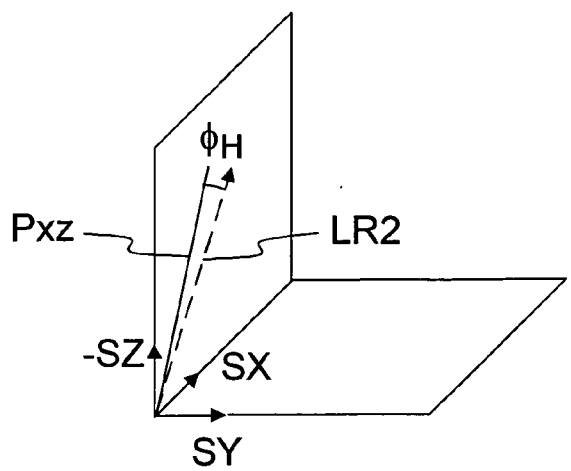
FIG. 7a shows the horizontal angle of a light ray.

FIG. 7a shows a horizontal angle φH of a light ray LR2. The horizontal angle is an angle between the direction of the light ray LR2 and a plane defined by the directions SX and SZ. In other words, the horizontal angle is an angle between the direction of the light ray LR2 and a projection Pxz of said light ray LR2 on the SX-SZ-plane.

The direction −SZ (minus SZ) is opposite the direction SZ.

Figure 7B:
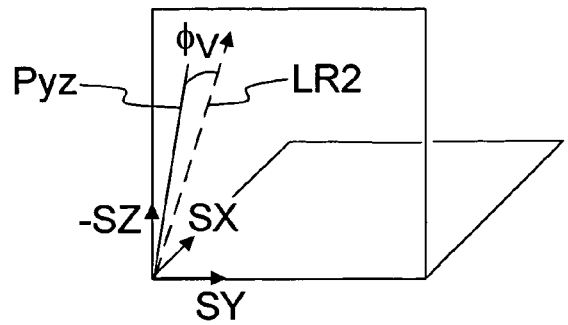
FIG. 7b shows the vertical angle of a light ray.

FIG. 7b shows a vertical angle φV of said light ray LR2. The vertical angle is an angle between the direction of the light ray LR2 and a plane defined by the directions SY and SZ. In other words, the vertical angle is an angle between the direction of the light ray LR2 and a projection Pyz of said light ray LR2 on the SY-SZ-plane.

Figure 8:
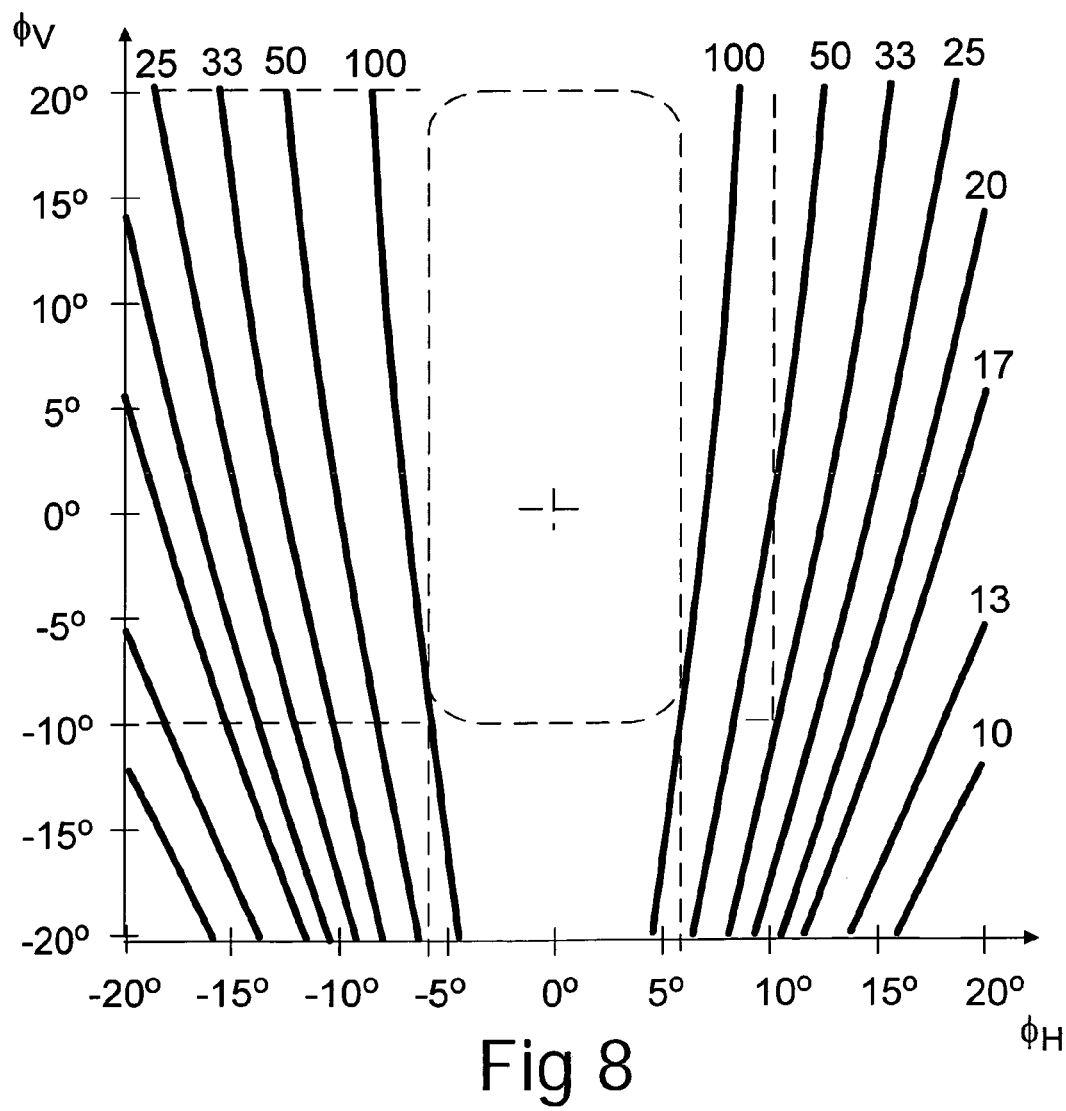
FIG. 8 shows the attainable contrast value as a function of the horizontal angle and the vertical angle.

FIG. 8 shows attainable contrast as a function of the horizontal angle φH and the vertical angle φV of the light rays LR2 of the out-coupled illuminating light beam B2.

The contrast values of FIG. 8 have been calculated for the following example case:

Refractive index of the substrate is equal to 1.7, and refractive index of the environment is 1.0. The environment may be e.g. air or inert gas.

The inclination angle α1 of the input surface is equal to 40°.

The diffractive out-coupling features 22 of the out-coupling area 20 are substantially in a plane defined by the directions SX and SY.

The diffractive out-coupling features 22 are substantially linear ridges, which are substantially parallel to the direction SY.

The diffractive out-coupling features 22 have an overhanging sawtooth profile, whose slant angle is 55°.

The grating period d1 of diffractive out-coupling features 22 is substantially equal to 400 nm, and the height h of the features 22 is substantially equal to 500 nm.

The upper and lower surfaces of the substrate are substantially parallel.

The input beam B0 provided by the light source 350 is TE-polarized.

The in-coupled beam B1 propagating within the substrate is TE-polarized with respect to the out-coupling area 20.

For example, it may be noticed that when the horizontal angles φH of the light rays LR2 are limited to the range of −6° to 6°, and when the vertical angles φV are limited to the range of −10° to 20°, then the attainable contrast is greater than or equal to 100.

If the out-coupled illuminating beam B2 has a substantially symmetrical angular intensity distribution with respect to the normal N2 of the out-coupling surface 20, then the horizontal divergence (full angle) of the beam B2 should thus be smaller than or equal to 12° and the vertical divergence (full angle) of the beam B2 should thus be smaller than or equal to 20° in order to provide a contrast greater than or equal to 100.

If the spread of the horizontal angles φH is increased to the range of −10° to 10°, while keeping the vertical angles φV in the range of −10° to 20°, then the attainable contrast is reduced to a value of 33.

The direction of the illuminating beam B2 may also be deviate from the perpendicular direction, i.e. the angular intensity distribution does not need to be symmetrical with respect to the normal N2 of the out-coupling area 20. When the horizontal angles φH of the light rays LR2 of the beam B2 are limited to the range of −6° to 6°, and when the vertical angles φV are limited to the range of −10° to 20°, then the attainable contrast is greater than or equal to 100.

The inclined direction of the beam B2 may be utilized e.g. when the display image IMG should be shifted with respect to the optical axis of the imaging optics 300, and/or when controlling the positions of the corners of the displayed image (e.g. when making keystone adjustment).

A desired direction of the illuminating beam B2 may be implemented by selecting the grating period d1.

The contrast means the ratio of the maximum intensity of the light of the image-forming beam B5 corresponding to a pixel P1 to the minimum intensity of the light of the image-forming beam B5 corresponding to said pixel P1. If light B3 reflected from an "off" state pixel P1 is not completely TM-polarized, residual light may be transmitted to the imaging optics 300. Consequently, the image of the pixel P1 does not appear completely black in the image IMG.

Referring back to FIG. 2, the input surface 30 may have and angle α1 with respect to the normal N2 and with respect to the direction SZ. In case of FIG. 8, the angle α1 is substantially equal to 40°, and the light beam B0 impinging on the input surface 30 may be substantially perpendicular to the input surface 30 so as to preserve linear polarization of the in-coupled light B1.

Figure 9:
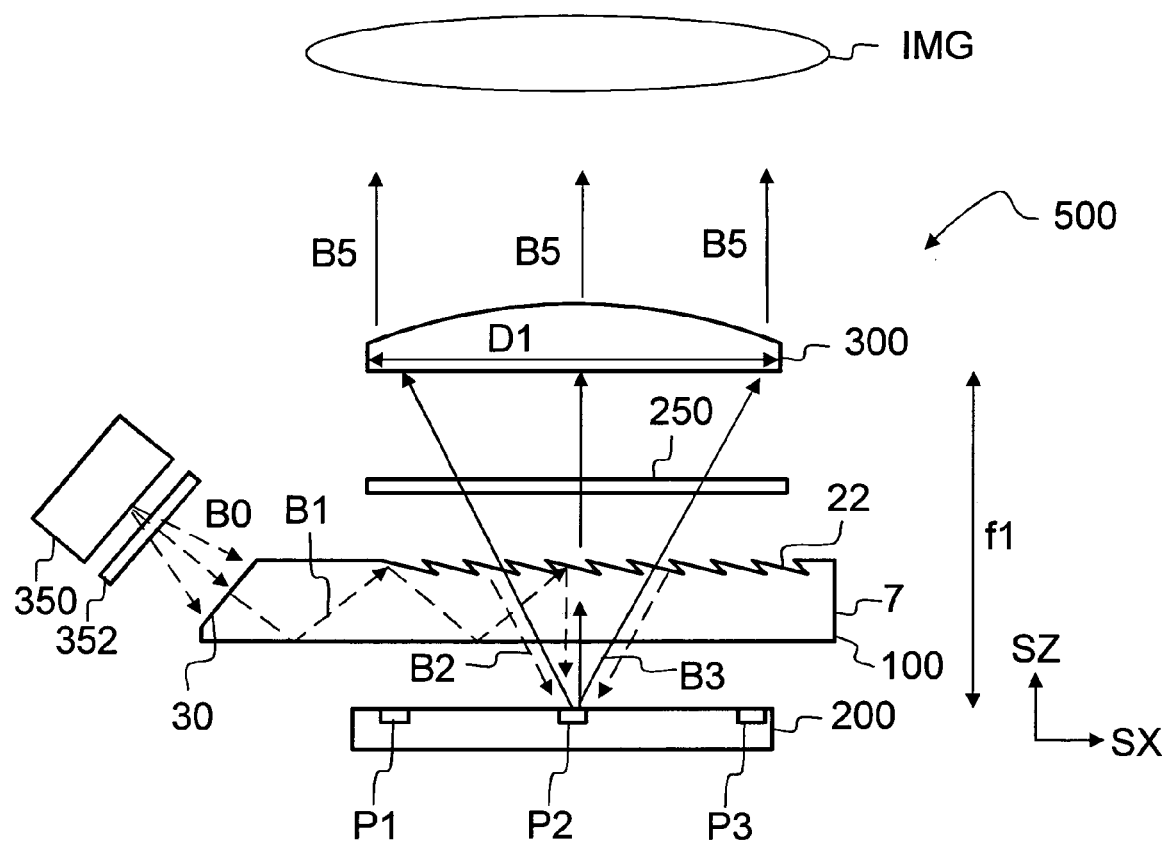
FIG. 9 shows the divergence of an illuminating light beam impinging on a single pixel.

FIG. 9 shows collimating or focusing of light B3 reflected from a single pixel P2. D1 means the dimension of the aperture of the imaging optics 300 in the direction SX. The dimensions of the aperture of the imaging optics 300 in the directions SX and SY may be selected to correspond to the horizontal and vertical divergence of the reflected beam B2. The horizontal and vertical divergence of the reflected beam B2 in turn depend on the horizontal and vertical divergence of the in-coupled beam B1 propagating in the substrate 7.

Now, because the horizontal and vertical divergence of the in-coupled beam B1 may be limited so as to attain a predetermined contrast (FIG. 8), the dimensions of the aperture of the imaging optics 300 may also be reduced, respectively. The aperture of the imaging optics 300 may even be substantially rectangular if the in-coupled beam B1 comprises light rays LR1 whose directions cover the rectangular dashed area shown in FIG. 8.

The distribution of the horizontal and vertical angles φH and φV may also be substantially elliptical or substantially circular in the φHφV-space. The corresponding optimal form of the aperture of the imaging optics 300 is substantially elliptical or substantially circular, respectively.

Now, because the height of the light distributing device 100, i.e. the dimension of the light distributing device 100 in the direction SZ is relatively small, the imaging optics 300 may have a small f-number (or a high numerical aperture). Consequently, the imaging device 500 may be very compact.

In case of circular apertures, the f-number refers to the ratio of the focal length f1 to the diameter D1 of the aperture.

FIG. 10a shows a grating having a sawtooth profile. In this case the angle γ2 is substantially equal to 0° (see FIG. 4). Also this profile may be used if it provides suitable diffraction efficiencies for TE and TM polarized light, i.e. a high diffraction efficiency for the illuminating beam B2 and a low diffraction efficiency for the reflected beam B3.

FIG. 10b shows a grating having a sawtooth profile. In this case the angles γ1 and γ2 have different signs. Also this profile may be used if it provides suitable diffraction efficiencies for TE and TM polarized light, i.e. a high diffraction efficiency for the illuminating beam B2 and a low diffraction efficiency for the reflected beam B3.

Figure 10C:
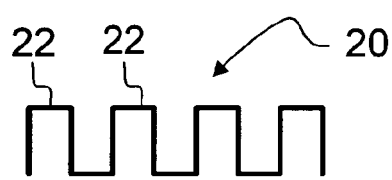
FIG. 10c shows out-coupling features having a binary rectangular profile.

FIG. 10c shows a grating having a rectangular binary profile. Also this profile may be used if it provides suitable diffraction efficiencies for TE and TM polarized light, i.e. a high diffraction efficiency for the illuminating beam B2 and a low diffraction efficiency for the reflected beam B3. This kind of a profile has also a further parameter which can be optimized, namely the filling factor of the profile. Also the filling factor of the profile may be selected so as to maximize the difference between the diffraction efficiencies for TE and TM-polarized light.

Figure 10D:
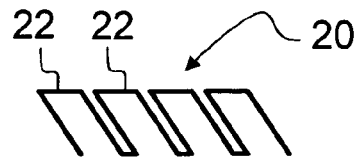
FIG. 10d shows out-coupling features having a binary slanted profile.

FIG. 10d shows a grating having a slanted binary profile. Also this profile may be used if it provides suitable diffraction efficiencies for TE and TM polarized light, i.e. a high diffraction efficiency for the illuminating beam B2 and a low diffraction efficiency for the reflected beam B3. Also the filling factor of the profile may be selected so as to maximize the difference between the diffraction efficiencies for TE and TM-polarized light.

Figure 10E:
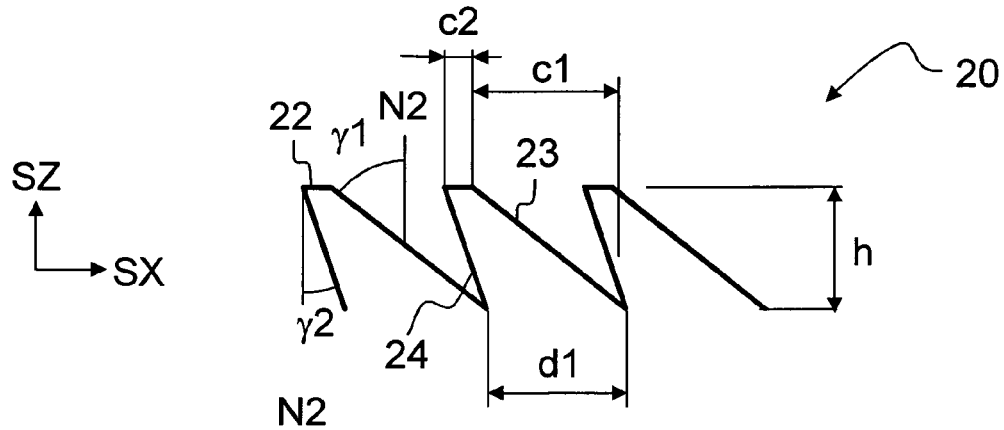
FIG. 10e shows slanted out-coupling features having a truncated sawtooth profile.

FIG. 10e shows a grating having an overhanging sawtooth profile, which has a truncated edge portion (or a rounded edge portion). The width c2 of the truncated edge portion of a diffracting ridge 22 may be e.g. in the range of 0 to 25% of the grating period d1. The width c1 of the inclined surface 23 of the ridge 22 may be e.g. greater than or equal to 70% of the grating period d1. Because the profile is overhanging, the sum c1+c2 may be greater than d1.

Figure 10F:
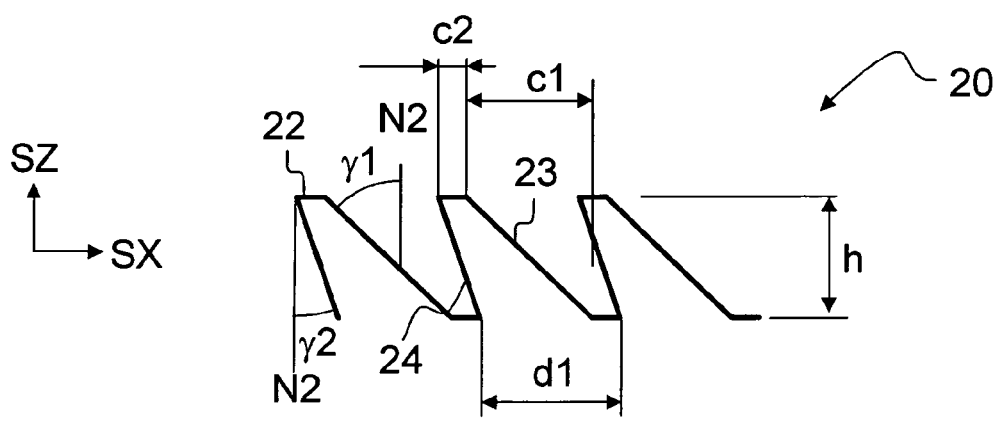
FIG. 10f shows slanted out-coupling features having a truncated sawtooth profile.

FIG. 10f shows a grating having an overhanging sawtooth profile, which has a truncated edge portion and a truncated bottom portion. The width c2 of the truncated edge portion may be e.g. in the range of 0 to 25% of the grating period d1. The width c1 of the inclined surface 23 of the ridge 22 may be e.g. in the range of 50 to 120% of the grating period d1. Because the profile is overhanging, the sum c1+c2 may be greater than d1. This profile may also be called as a trapezoidal profile. However, the truncated edge and the bottom portion do not need to be parallel.

Figure 10G:
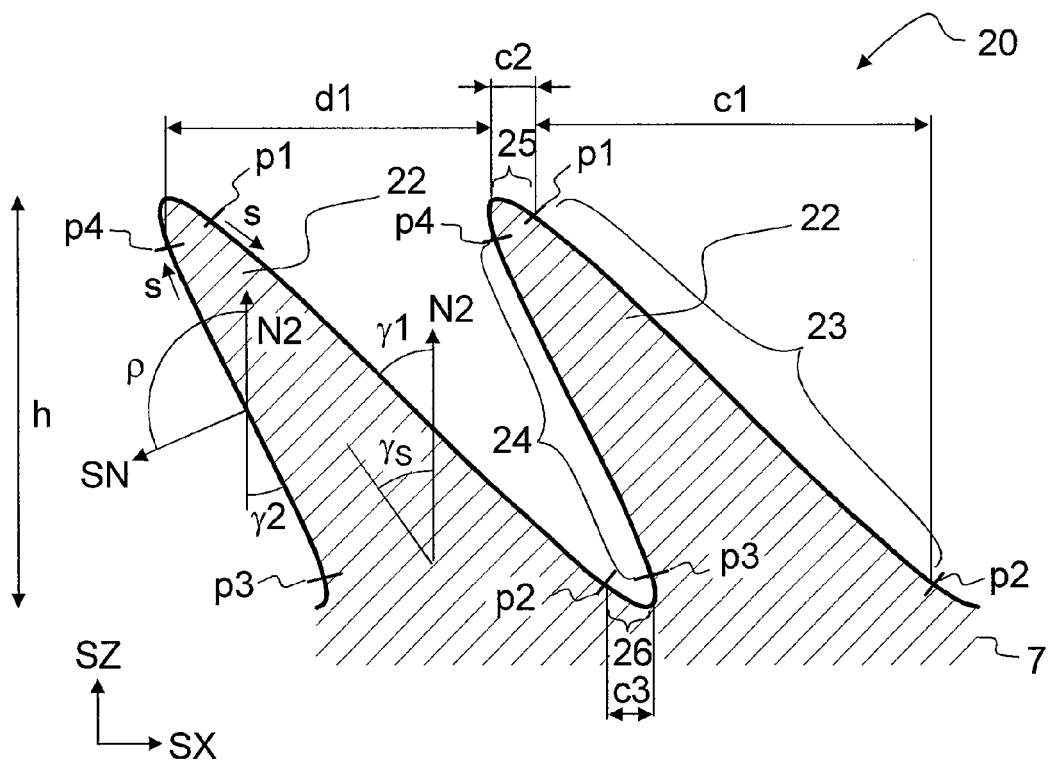
FIG. 10g shows slanted out-coupling features having a truncated sawtooth profile.

FIG. 10g shows a grating having an overhanging sawtooth profile, which has a rounded edge portion 25 and/or a rounded bottom portion 26. The width c2 of the truncated or rounded edge may be e.g. in the range of 0 to 25% of the grating period d1. The width c1 of the inclined surface 23 of the ridge 22 may be e.g. in the range of 70 to 120% of the grating period d1. The width of the bottom portion 26 may be e.g. in the range of 0 to 25% of the grating period d1. The widths c1, c2 and c3 are measured in the direction SX.

The diffractive out-coupling features (ridges) 22 may have substantially identical size and form.

The point p1 indicates a boundary between the rounded edge portion 25 and the first inclined surface 23. The point p2 indicates a boundary between the rounded bottom portion 26 and the first inclined surface 23. The point p3 indicates a boundary between the rounded bottom portion 26 and the second inclined (overhanging) surface 24. The point p4 indicates a boundary between the rounded edge portion 25 and the second inclined surface 24.

In fact, the points p1, p2, p3, and p4 are boundary lines separating the surface portions 23, 24, 25, 26. Thus, p1, p2, p3, and p4 may denote boundary lines substantially parallel to the direction SY. The projection of such a line on the SX-SZ-plane is a point. Hence, p1, p2, p3, and p4 are called as "points" in FIGS. 10g and 11.

Figure 11:
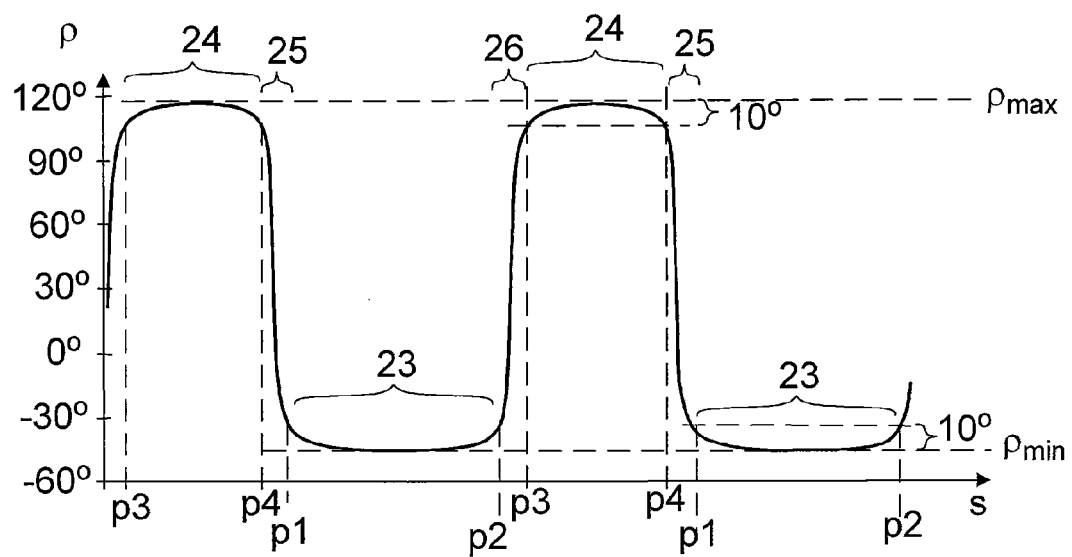
FIG. 11 shows the direction of the local surface normal at different points of the grating profile of FIG. 10g.

FIG. 11 shows the direction of local surface normal SN at different points p1, p2, p3, p4 of the profile of FIG. 10g. The local surface normal SN at each point of the profile is a vector which is perpendicular to a microscopical surface area at said point.

The letter s denotes a position along the curvilinear perimeter of the profile, i.e. a path length from a predetermined reference point along the curvilinear perimeter of the profile.

The local surface normal SN should not be confused with the global normal N2. The global surface normal N2 of the out-coupling area 20 is perpendicular to a common tangential plane which touches the peaks of the out-coupling features 22.

The direction of the local surface normal SN is expressed by a direction angle ρ with respect to the global normal N2. The direction angle ρ depends on the position s.

The minimum value of the direction angle ρ of the surface 23 of the profile of FIG. 10g is negative. The maximum value of the direction angle ρ of the overhanging surface 24 of FIG. 10g is greater than 90°. The maximum value of the direction angle ρ of the surface 24 may be e.g. smaller than 150°. The values of the direction angles ρ are limited to the range of −180° to 180°.

The boundary points p1 and p2 may be defined to be at locations where the direction angle ρ has increased by 10° from its minimum value $\rho_{MIN}$. The boundary points p3 and p4 may be defined to be at locations where the direction angle ρ has decreased by 10° from its maximum value $\rho_{MAX}$.

The edge portion 25 and the bottom portion 26 comprise points where the profile is vertical (i.e. where ρ=0°). The edge portion 25 and the bottom portion 26 further comprise points where the profile is locally horizontal (i.e. where ρ=90°). The first inclined surface 23 and the second inclined surface 24 do not comprise points where the profile is locally horizontal. The first inclined surface 23 and the second inclined surface 24 do not comprise points where the profile is locally vertical.

A profile of a diffraction grating is herein defined to be an overhanging sawtooth profile when the width c2 of the edge portion 25 is in the range of 0 to 25% of the grating period d1, when the width c3 of the bottom portion 26 is in the range of 0 to 25% of the grating period d1, and when the maximum direction angle ρ of the surface 24 is greater than 100°.

The edge portion and/or the bottom portion of the sawtooth profile may be sharp, truncated or rounded.

The width c1 of the inclined surface 23 of the sawtooth profile may be e.g. in the range of 50 to 120% of the grating period d1.

The angles γ1 and γ2 define the orientation of the inclined surfaces 23, 24 with respect to the global normal N2. The angle γ1 may be e.g. in the range of 40 to 75°, preferably in the range of 55 to 70°. The angle γ2 may be e.g. in the range of 10 to 60°, preferably in the range of 25 to 55°. The average value if the angles γ1 and γ2 is called as the slant angle $\gamma_S$. The slant angle $\gamma_S$ may be e.g. in the range of 30 to 65°, preferably in the range of 45 to 60°. An optimum slant angle $\gamma_S$ may be e.g. 55°.

The height h of the out-coupling features 22 may be greater than or equal to the grating period d1.

An advantage associated with using the overhanging sawtooth profile (FIGS. 4, 10e, 10f, 10g) instead of e.g. the slanted binary profile (FIG. 10d) is that the overhanging sawtooth profile allows the use of a more diverging illuminating beam B2, while still providing a predetermined contrast value (See FIG. 8). In particular, the divergence of the beam B2 may be considerably increased when the slant angle $\gamma_S$ is in the range of 30 to 65°.

A sawtooth profile may also be called as a triangular profile. The edge portion of the triangular profile may be sharp, rounded, or truncated. The bottom portion of the triangular profile may be sharp, rounded, or truncated.

The edge portion 25 may also be called as a top portion. The first inclined portion 23 may also be called as a first side portion. The second inclined portion 24 may also be called as a second side portion. The edge portion 25 is between the first inclined portion 23 and the second inclined portion 24. The bottom portion 26 is between the first inclined portion 23 of a first out-coupling feature 22 and a second inclined portion 24 of a second adjacent out-coupling portion 22. Thus, the bottom portion 26 is adjacent to the first inclined portion 24 of said first out-coupling feature 22.

The diffractive out-coupling ridges 22 of a diffraction grating may be implemented on the substrate 7. In FIGS. 10a-10g, the substrate 7 of the light distributing device 100 may be understood to be on the lower side the out-coupling features 22. Thus, light propagating in the direction SZ is coupled out of the substrate 7.

The diffractive out-coupling ridges 22 of the diffraction grating may be made methods described e.g. in PCT/FI2005/050422 (which describes methods for making slanted gratings).

Figure 12:
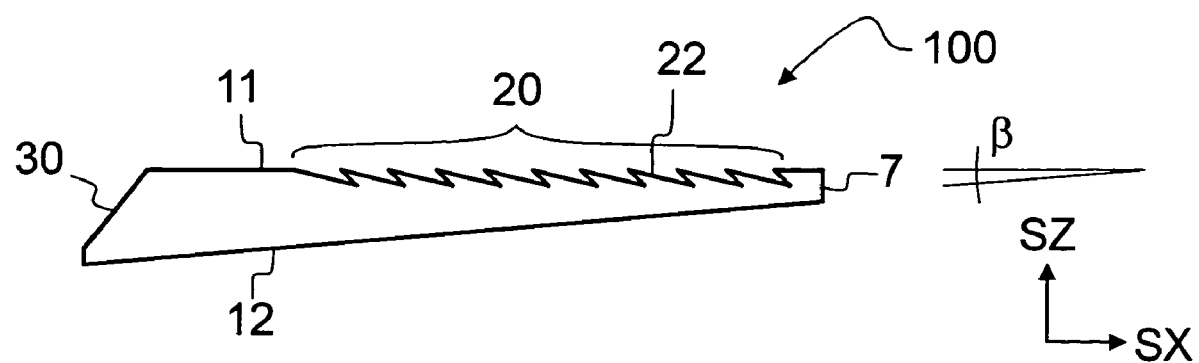
FIG. 12 shows a light distributing device having a wedge-shaped substrate.

FIG. 12 shows a wedge-shaped substrate 7. The upper surface 11 and the lower surface 12 may be substantially planar. The angle $\beta$ between the upper surface 11 of the substrate 7 and the lower surface 12 of the substrate may also deviate from zero. The angle $\beta$ may be e.g. greater than 0° and smaller than or equal to 2°. However, in that case each reflection at the upper and lower surfaces 11, 12 changes the vertical divergence of the in-coupled beam B1 and may ultimately lead to degradation of the contrast of the image IMG if the angle $\beta$ is too large. The angle $\beta$ may be selected so as to keep the contrast greater than or equal to a predetermined level.

The upper surface 11 and the lower surface 12 may also be substantially parallel, i.e. the angle $\beta$ may be substantially equal to zero. The substrate 7 may be a substantially planar light guide.

Figure 13:
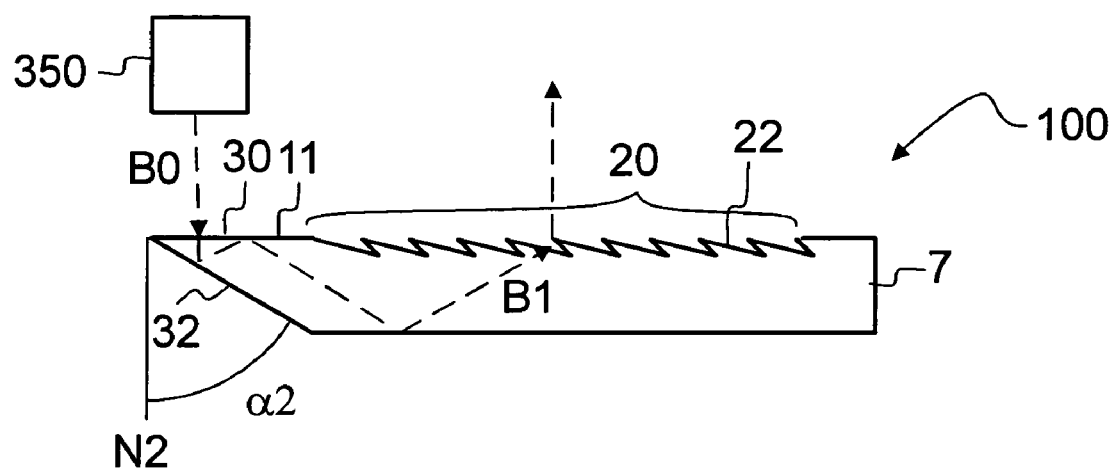
FIG. 13 shows a light distributing device whose substrate comprises a facet to change the direction of an in-coupled light beam.

Referring to FIG. 13, the light B0 of the light source 350 may be coupled into the substrate 7 also through the upper 11 or lower surface of the substrate 7, i.e. the upper surface 11 may also act as an input surface 30. The substrate 7 and/or the light distributing device 100 may comprise a light directing surface 32 to change the direction of the in-coupled beam B1. The light directing surface 32 may have an angle $\alpha 2$ with respect to the normal N2. The angle $\alpha 2$ may be e.g. in the range of 20 to 30° or in the range of 50 to 60°.

The display device 500 may be arranged to project a real image IMG on a screen to be viewed by one or more viewers. The imaging optics 300 may be arranged to focus light B5 on an external screen in order to project a real image on said screen. Light reflected from each pixel P1, P2, P3 may be substantially focused into a corresponding spot on the screen. The distance between the device 500 and the screen may be e.g. in the range of 0.3 to 7 meters, and the displayed image IMG may be viewed by one or more persons. In other words, the display device 500 may be an image projector.

Alternatively, the display device 500 may be arranged to display a virtual image, which may be observable when the light B5 provided by the imaging optics 300 impinges on the eye of a viewer. The imaging optics 300 may be arranged to collimate light reflected from each pixel P1, P2, P3 of the display element 200. An image typically comprises several image pixels. The collimated beams B5 corresponding to the several pixels, and which impinge on the eye of a viewer, create an impression of a virtual image.

A virtual display device 500 which comprises the light source 350, the light distributing device 100, the display element 200, and the imaging optics 300 may also be called as an optical engine. The imaging optics 300 may also comprise a diffractive beam expander to enlarge the exit pupil of a virtual display device 500.

The same device 500 may be adapted to operate as a projector and as a virtual display device. However, the optical power level required in case of the image projector may be by several orders of magnitude greater than when displaying virtual images.

The display element 200 may be e.g. an LCOS modulating array (Liquid Crystal On Silicon). Each pixel P1, P2, P3 of an LCOS array comprises a reflective layer to reflect light and a liquid crystal layer to change the polarization state of reflected light, depending on the state of said pixel P1, P2, P3. The state of the pixels may be changed e.g. by changing the orientation of liquid crystals by applying a voltage to electrodes.

Two or more light distributing device 100 may be stacked on top of each other so as to display color images. A first light source 350 may be arranged to provide red light to a first light distributing device 100. A second light source 350 may be arranged to provide green and blue light to a second light distributing device 100. The second light source 350 may be arranged to emit green and blue light sequentially in synchronization with the pixels of the display element 200.

Light provided by the first light distributing device 100 may be arranged to pass through the second light distributing device, or vice versa.

The first light distributing device 100 may be arranged to transmit green and/or blue light substantially independently of the polarization state of said green and/or blue light. The first light distributing device 100 may be arranged to transmit red light substantially independently of the polarization state of said red light.

The light source 350 may comprise several sub light sources, e.g. light emitting diodes (LEDs), which provide different colors and which are arranged to emit light in sequential order. The display element 200 may be synchronized with the operation of the sub light sources in order to display multi-color images.

Light sources having different colors may also be arranged to emit light into the same substrate 7.

The substrate 7 of the light distributing device may comprise or consist of e.g. polycarbonate, polymethyl methacrylate (PMMA), or glass. The material of the substrate 7 may be selected so as to minimize birefringence. The substrate 7 may be manufactured so that birefringence of the material is minimized. For example, it has been noticed that a plastic substrate 7 made by injection molding has higher internal stresses, and consequently also higher birefringence than a plastic substrate 7 made by extrusion.

Referring back to FIG. 2, the distance L1 between the out-coupling area 20 and the display element 200 may be selected according to the period d1 between adjacent out-coupling features 22 (FIG. 4). If the distance L1 is too small when compared with the period d1, then spatial aliasing may degrade the quality of the displayed image IMG.

For example, the distance L1 may be greater than or equal to 1 mm when the period d1 is in the range of 20 to 60 µm. In that case the out-coupling features 22 may be e.g. a plurality of refractive or reflective prisms. The prisms may be covered with a polarizing film.

For example, the distance L1 may be greater than or equal to 0.05 mm and smaller than or equal to 1 mm when the period d1 is in the range of 1 to 3 µm. In that case the out-coupling features 22 may form a diffractive grating.

The out-coupling features 22 may cover substantially 100% of the area of the out-coupling area 20. This may provide the highest polarization selectivity.

Alternatively, the out-coupling area 20 may comprise a substantially flat non-diffracting area or areas between smaller diffractive areas. Each diffractive area may comprise a plurality of diffractive out-coupling ridges. For example, 10 to 70% of the area within the perimeter of the out-coupling area 20 may be non-diffracting. The out-coupling features 22 may cover e.g. 30% to 90% of the area of the out-coupling area 20, respectively.

The display device 500 may further comprise e.g. a data processing unit, memory and communications unit to provide access to a mobile telephone network, internet or local area network. The display device 500 may be or may be a part of a device selected from the following list: a display module connectable to a further device, portable device, device with wireless telecommunicating capabilities, imaging device, mobile phone, gaming device, music recording/playing device (based on e.g. MP3-format), remote control transmitter or receiver, navigation instrument, measuring instrument, target finding device, aiming device, navigation device, personal digital assistant (PDA), communicator, portable internet appliance, hand-held computer, accessory to a mobile phone.

The display device 500 may be arranged to display an image IMG, which is e.g. graphics or text.

An aspect of the invention may also be a polarization-selective diffraction grating 20 as such, wherein said polarization-selective diffraction grating 20 has an overhanging sawtooth grating profile. In that case the angle γ1 may be e.g. in the range of 40 to 75°, preferably in the range of 55 to 70°. The angle γ2 may be e.g. in the range of 10 to 60°, preferably in the range of 25 to 55°. The slant angle $\gamma_S$ may be e.g. in the range of 30 to 65°, preferably in the range of 45 to 60°. The height h of the out-coupling features 22 may be greater than or equal to the grating period d1. The diffraction grating may be implemented on a light-transmitting substrate 7. In that case the substrate may have any form.

The invention is further illustrated by the following examples:

EXAMPLE 1

A device (500) comprising:
a light source (350) to provide an input light beam (B0),
a substrate (7) having an input surface (30) to form an in-coupled light beam (B1) by receiving light of said input light beam (B0), wherein said in-coupled light beam (B1) is substantially polarized, and wherein said in-coupled light beam B1 is confined to said substrate (7) by total internal reflections, and said substrate (7) further comprising a plurality of out-coupling features (22) to form an illuminating light beam (B2) by diffracting light of said in-coupled light beam (B1) out of said substrate (7),
a display element (200) having a plurality of reflective polarization-rotating pixels (P1, P2, P3) arranged to form reflected light beams (B3) by reflecting light of said illuminating light beam (B2), and
imaging optics (300) to form an image (IMG) by focusing or collimating light of said reflected light beams (B3) transmitted through said out-coupling features (22).

EXAMPLE 2

The device (500) of example 1 wherein said out-coupling features (22) are arranged to transmit light of said reflected light beams (B3) towards said imaging optics (300) when the light of said reflected light beams (B3) has a first polarization state and to at least partially prevent transmission of light of said reflected light beams (B3) towards said imaging optics (300) when the light of said reflected light beams (B3) has a second polarization state.

EXAMPLE 3

The device (500) of example 1 or 2 wherein said out-coupling features (22) form a diffractive grating having an overhanging sawtooth profile.

EXAMPLE 4

The device (500) of claim 3 wherein each out-coupling feature (22) has a first inclined surface (23), a second inclined surface (24), an edge portion (25) between said first inclined surface (23) and said second inclined surface (24), and a bottom portion (26) adjacent to said first inclined surface (23), wherein the width (c2) of said edge portion (25) is in the range of 0 to 25% of the grating period (d1) of said out-coupling features (22), the width (C3) of said bottom portion (26) is in the range of 0 to 25% of the grating period (d1) of said out-coupling features (22), and a maximum angle ($\rho_{MAX}$) between a local surface normal (SN) of said second inclined surface and a global surface normal (N2) of said out-coupling features being greater than 100°.

EXAMPLE 5

The device (500) according to any of the examples 1 to 4 wherein the slant angle ($\gamma_S$) of said out-coupling features (22) is in the range of 30° to 65°.

EXAMPLE 6

The device (500) according to any of the examples 1 to 5 wherein said input surface (30) is inclined with respect to the normal (N2) of an out-coupling area (20) formed by said out-coupling features (22).

EXAMPLE 7

The device (500) according to any of the examples 1 to 6 comprising a polarizer (250) arranged to transmit light of said reflected light beams (B3) towards said imaging optics (300) when the light of said reflected light beams (B3) has a first polarization state and to prevent or reduce transmission of light of said reflected light beams (B3) towards said imaging optics (300) when the light of said reflected light beams (B3) has a second polarization state.

EXAMPLE 8

The device (500) according to any of the examples 1 to 7 wherein the horizontal and vertical divergence of the input light beam (B0) provided by the light source (350) has been selected so as to attain a predetermined contrast of the displayed image (IMG).

EXAMPLE 9

A device (100) for distributing light, said device comprising:
- a substrate (7),
- an input surface (30) to form an in-coupled light beam (B1) by receiving light of an input light beam (B0) into said substrate (7), wherein said substrate (7) is arranged to confine light of said in-coupled light beam B1 to said substrate (7) by several consecutive total internal reflections, and
- a plurality of out-coupling features (22) to form an illuminating light beam B2 by diffracting light of said in-coupled light beam (B1) out of said substrate (7), said out-coupling features (22) being further arranged to reduce or prevent transmission of a reflected light beam (B3) through said out-coupling area (20) when said reflected light beam (B3) has a different polarization state than said in-coupled beam (B1).

EXAMPLE 10

The device (100) of example 9, wherein said out-coupling features (22) form a diffraction grating having an overhanging sawtooth profile.

EXAMPLE 11

The device (100) of example 9 or 10, wherein said input surface (30) is inclined with respect to the normal (N2) of an out-coupling area (20) formed by said out-coupling features (22).

EXAMPLE 12

A method for displaying an image (IMG), said method comprising:
- providing an input light beam (B0),
- forming an in-coupled light beam B1 by coupling light of said input light beam (B0) into a substrate (7), wherein said in-coupled light beam (B1) is substantially polarized, and wherein said in-coupled light beam (B1) is confined to said substrate (7) by total internal reflections,
- diffracting light of said in-coupled light beam (B1) out of said substrate (7) by a plurality of out-coupling features (22) in order to form an illuminating light beam (B2),
- reflecting light of said illuminating light beam (B2) by a plurality of reflective polarization-rotating pixels (P1, P2, P3) in order to form reflected light (B3),
- transmitting said reflected light (B3) through said out-coupling features (22), and
- focusing or collimating said reflected light (B3) transmitted through said out-coupling features (22) in order to display said image (IMG).

EXAMPLE 13

The method of example 12 wherein said out-coupling features (22) have an overhanging sawtooth profile.

EXAMPLE 14

A device (500) comprising:
- a light emitting means (350) to provide an input light beam (B0),
- a light distribution means (100) having an input means (30) to form an in-coupled light beam (B1) by receiving light of said input light beam (B0), wherein said in-coupled light beam (B1) is substantially polarized, and wherein said in-coupled light beam B1 is confined to said light distribution means (100) by total internal reflections, said light distribution means (100) further comprising out-coupling means (22) to form an illuminating light beam (B2) by diffracting light of said in-coupled light beam (B1) out of said light distribution means (100),
- a display means (200) comprising a plurality of reflective polarization-rotating light-modulating means (P1, P2, P3) arranged to form reflected light beams (B3) by reflecting light of said illuminating light beam (B2), and
- imaging means (300) to form an image (IMG) by focusing or collimating light of said reflected light beams (B3) transmitted through said out-coupling means (22).

EXAMPLE 15

The device (500) of example 14 wherein said out-coupling means (22) have an overhanging sawtooth profile.

The drawings are schematic. For the person skilled in the art, it will be clear that modifications and variations of the devices and methods according to the present invention are perceivable. The particular embodiments described above with reference to the accompanying drawings are illustrative only and not meant to limit the scope of the invention, which is defined by the appended claims.

What is claimed is:

1. An apparatus comprising:
   a light source to provide an input light beam,
   a substrate having an input surface to form an in-coupled light beam by receiving light of said input light beam, wherein said in-coupled light beam is substantially polarized, and wherein light of said in-coupled light beam is confined to said substrate by total internal reflections, said substrate further comprising a plurality of out-coupling features to form an illuminating light beam by diffracting light of said in-coupled light beam out of said substrate,
   a display element having a plurality of reflective polarization-rotating pixels arranged to form reflected light beams by reflecting light of said illuminating light beam, and
   imaging optics to form an image by focusing or collimating light of said reflected light beams transmitted through said out-coupling features,
   wherein said out-coupling features form a diffractive grating having a sawtooth profile such that said out-coupling features have a first inclined surface, a second inclined surface, an edge portion between said first inclined surface and said second inclined surface, and a bottom portion adjacent to said first inclined surface, wherein the width of said edge portion is in the range of 0 to 25% of a grating period of said out-coupling features, the width of said bottom portion is in the range of 0 to 25% of the grating period of said out-coupling features, and a maximum angle between a local surface normal of said second inclined surface and a global surface normal of said out-coupling features is greater than 100°.

2. The apparatus of claim 1, wherein said out-coupling features are arranged to transmit light of said reflected light beams towards said imaging optics when the light of said reflected light beams has a first polarization state and to at least partially prevent transmission of light of said reflected light beams towards said imaging optics when the light of said reflected light beams has a second polarization state.

3. The apparatus of claim 1, wherein a slant angle of said out-coupling features is in the range of 30° to 65°.

4. The apparatus of claim 1, wherein said input surface is inclined with respect to the normal of an out-coupling area formed by said out-coupling features.

5. The apparatus of claim 1, comprising a polarizer arranged to transmit light of said reflected light beams towards said imaging optics when the light of said reflected light beams has a first polarization state and to prevent or reduce transmission of light of said reflected light beams towards said imaging optics when the light of said reflected light beams has a second polarization state.

6. The apparatus of claim 1, wherein the horizontal and vertical divergence of said input light beam provided by the light source has been selected so as to attain a predetermined contrast of the displayed image.

7. An apparatus for distributing light, said device comprising:
   a substrate,
   an input surface to form an in-coupled light beam by receiving light of an input light beam into said substrate, wherein said substrate is arranged to confine light of said in-coupled light beam to said substrate by several consecutive total internal reflections, and
   a plurality of out-coupling features to form an illuminating light beam by diffracting light of said in-coupled light beam out of said substrate, said out-coupling features being further arranged to reduce or prevent transmission of a reflected light beam through said out-coupling area when said reflected light beam has a different polarization state than said in-coupled beam,
   wherein said out-coupling features form a diffractive grating having a sawtooth profile such that said out-coupling features have a first inclined surface, a second inclined surface, an edge portion between said first inclined surface and said second inclined surface, and a bottom portion adjacent to said first inclined surface, wherein the width of said edge portion is in the range of 0 to 25% of a grating period of said out-coupling features, the width of said bottom portion is in the range of 0 to 25% of the grating period of said out-coupling features, and a maximum angle between a local surface normal of said second inclined surface and a global surface normal of said out-coupling features is greater than 100°.

8. The apparatus of claim 7, wherein a slant angle of said out-coupling features is in the range of 30° to 65°.

9. The apparatus of claim 7, wherein said input surface is inclined with respect to the normal of an out-coupling area formed by said out-coupling features.

10. A method for displaying an image, said method comprising:
    providing an input light beam,
    forming an in-coupled light beam by coupling light of said input light beam into a substrate, wherein said in-coupled light beam is substantially polarized, and wherein said in-coupled light beam is confined to said substrate by total internal reflections,
    diffracting light of said in-coupled light beam out of said substrate by a plurality of out-coupling features in order to form an illuminating light beam,
    reflecting light of said illuminating light beam by a plurality of reflective polarization-rotating pixels in order to form reflected light,
    transmitting said reflected light through said out-coupling features, and
    focusing or collimating said reflected light transmitted through said out-coupling features in order to display said image,
    wherein said out-coupling features form a diffractive grating having a sawtooth profile such that said out-coupling features have a first inclined surface, a second inclined surface, an edge portion between said first inclined surface and said second inclined surface, and a bottom portion adjacent to said first inclined surface, wherein the width of said edge portion is in the range of 0 to 25% of a grating period of said out-coupling features, the width of said bottom portion is in the range of 0 to 25% of the grating period of said out-coupling features, and a maximum angle between a local surface normal of said second inclined surface and a global surface normal of said out-coupling features is greater than 100°.

11. The method of claim 10, wherein a slant angle of said out-coupling features is in the range of 30° to 65°.

12. An apparatus comprising:
    means for providing an input light beam,
    means for distributing light, having an input for forming an in-coupled light beam by receiving light of said input light beam, wherein said in-coupled light beam is substantially polarized, and wherein said in-coupled light beam is confined to said means for distributing by total internal reflections, said means for distributing further comprising means for forming an illuminating light beam by diffracting light of said in-coupled light beam out of said means for distributing,
    means for forming reflected light beams by reflecting light of said illuminating light beam, and
    means for forming an image by focusing or collimating light of said reflected light beams,
    wherein said means for forming an illuminating light beam form a diffractive grating having a sawtooth profile such that the means for forming an illuminating light beam have a first inclined surface, a second inclined surface, an edge portion between said first inclined surface and said second inclined surface, and a bottom portion adjacent to said first inclined surface, wherein the width of said edge portion is in the range of 0 to 25% of a grating period of the means for forming an illuminating light beam, the width of said bottom portion is in the range of 0 to 25% of the grating period of said means for forming an illuminating light beam, and a maximum angle between a local surface normal of said second inclined surface and a global surface normal of said out-coupling features is greater than 100°.

13. The apparatus of claim 12, wherein a slant angle of the means for forming an illuminating light beam is in the range of 30° to 65°.

\* \* \* \* \*